Patented July 13, 1926.

1,592,758

UNITED STATES PATENT OFFICE.

EDMUND L. DAY, OF WESTLINE, PENNSYLVANIA.

COMPOSITION AND METHOD OF PRODUCING FUEL.

No Drawing.   Application filed January 5, 1925.  Serial No. 702.

This invention appertains to an improved type of fuel which can be efficiently used, in lieu of coal, wood and the like and the primary object of the invention is to provide a fuel constructed substantially from waste material and which will burn under all conditions to a fine white ash.

Another object of the invention is the provision of a novel method of producing the fuel, whereby the fuel can be readily handled after manufactured and placed upon the market at a small cost.

The composition preferably consists of a mixture of tar and sawdust or finely divided particles of charcoal of the size of the hand or other size, that may be found advisable.

The tar is obtained from the destructive distillation of wood and it is not contemplated of using mineral tar.

In preparing the composition, I prefer to use the ingredients in about the following proportions tar 75 per cent, and sawdust or powdered charcoal 25 per cent.

These proportions may be varied within a certain per cent, but the best results have been attained from the above mentioned proportions.

The improved method of making the fuel is as follows; The tar is obtained by the destructive distillation of wood in any well known manner and the tar is placed in a suitable closed vessel and boiled. The charcoal or sawdust can be added to the tar before the boiling process or during the boiling process. If preferred the boiling process can be substituted by a distilling process.

The boiling or distilling is continued until the mass is of a sufficient consistency wherein the same will readily solidify upon being brought to an atmospheric temperature. The solid mass is frangible and can be readily broken into the desired size.

Changes in details may be made without departing from the spirit or scope of the invention, but:

What I claim as new is:

1. The method of producing a substitute fuel which consists in distilling liquid tar in a closed vessel and combining with the tar charcoal during the distilling process.

2. The method of producing a solid hydrocarbon fuel which consists in boiling liquid tar obtained from the destructive distillation of wood in a closed vessel and adding sawdust thereto and boiling the resultant mass until the same reaches a sufficient consistency to solidify upon being brought to an atmospheric temperature.

In testimony whereof I affix my signature.

EDMUND L. DAY.